(12) United States Patent
Kim et al.

(10) Patent No.: US 11,867,817 B2
(45) Date of Patent: Jan. 9, 2024

(54) CAMERA MODULE AND DEPTH INFORMATION EXTRACTION METHOD THEREOF

(71) Applicant: LG INNOTEK CO., LTD., Seoul (KR)

(72) Inventors: Eun Song Kim, Seoul (KR); Chang Hyuck Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 447 days.

(21) Appl. No.: 17/280,734

(22) PCT Filed: Sep. 26, 2019

(86) PCT No.: PCT/KR2019/012524
§ 371 (c)(1),
(2) Date: Mar. 26, 2021

(87) PCT Pub. No.: WO2020/067737
PCT Pub. Date: Apr. 2, 2020

(65) Prior Publication Data
US 2022/0120909 A1   Apr. 21, 2022

(30) Foreign Application Priority Data
Sep. 28, 2018 (KR) .......... 10-2018-0116462

(51) Int. Cl.
*G01S 17/894* (2020.01)
*G01S 7/481* (2006.01)

(52) U.S. Cl.
CPC .......... *G01S 17/894* (2020.01); *G01S 7/4816* (2013.01)

(58) Field of Classification Search
CPC .............................. G01S 17/894; G01S 7/4816
See application file for complete search history.

(56) References Cited

U.S. PATENT DOCUMENTS 9,325,973 B1     4/2016  Hazeghi et al.
2015/0356738 A1* 12/2015  Yoon ................... H04N 13/243
                                                  348/47
2018/0176540 A1   6/2018  Jeon et al.

FOREIGN PATENT DOCUMENTS

KR         10-1020999 B1      3/2011
KR     10-2013-0098040 A      9/2013
(Continued)

*Primary Examiner* — Girumsew Wendmagegn
(74) *Attorney, Agent, or Firm* — Birch, Stewart, Kolasch & Birch, LLP

(57) ABSTRACT

A camera device according to one embodiment of the present disclosure, comprises: a light output unit which outputs an output-light signal irradiated on an object; a lens unit which comprises an infrared (IR) filter and at least one lens arranged on the IR filter, and condenses an input-light signal reflected from the object; an image sensor which generates an electrical signal from the input-light signal condensed by the lens unit; a tilting unit which shifts the optical path of the input-light signal according to a predetermined rule; and an image control unit which acquires depth information of the object by using a phase difference between the output-light signal and the input-light signal received at the image sensor, wherein the image control unit acquires the depth information of the object by using data extracted during a plurality of periods during which the optical path of the input-light signal is repeatedly shifted according to the predetermined rule, and the image control unit corrects the difference between a preconfigured shift value of the optical path of the input-light signal, and the actual shift value.

20 Claims, 15 Drawing Sheets

(56) References Cited

FOREIGN PATENT DOCUMENTS

| KR | 10-1629610 B1 | 6/2016 |
| KR | 10-2017-0005649 A | 1/2017 |
| WO | WO 2017/149092 A2 | 9/2017 |

\* cited by examiner (a) (b)

(a)

(b)

CAMERA MODULE AND DEPTH INFORMATION EXTRACTION METHOD THEREOF

CROSS REFERENCE TO RELATED APPLICATIONS

This application is the National Phase of PCT International Application No. PCT/KR2019/012524, filed on Sep. 26, 2019, which claims priority under 35 U.S.C. 119(a) to Patent Application No. 10-2018-0116462, filed in the Republic of Korea on Sep. 28, 2018, all of which are hereby expressly incorporated by reference into the present application.

TECHNICAL FIELD

The present disclosure relates to a camera module and a depth information extraction method thereof.

BACKGROUND ART

The 3D contents are applied in many fields such as education, manufacturing, and autonomous driving as well as games and culture, and depth information (or depth map) is required to acquire the 3D contents. The depth information is information representing a distance in space, and represents perspective information of one point to the other points in a 2D image.

One of the methods of obtaining the depth information is a method of projecting infrared (IR) structured light onto an object and analyzing the light reflected from the object to extract the depth information. According to the method using the IR structured light, there is a problem that it is difficult to obtain a desired level of depth resolution for a moving object.

Meanwhile, a time-of-flight (TOF) method is drawing attention as a technology to replace the method using the IR structured light.

According to the TOF method, the distance to an object is calculated by measuring the flight time, i.e., the time it takes for emitted light to return by being reflected. The greatest advantage of the ToF method is that it provides distance information for 3D space in real time quickly. In addition, the user may obtain accurate distance information without applying separate algorithms or hardware correction. In addition, accurate depth information may be obtained by measuring a very close subject or a moving subject.

However, the current ToF method has a problem in that information that can be obtained per frame, i.e., resolution is low.

One way to increase the resolution is to increase the number of pixels of an image sensor. However, in this case, there is a problem that the volume and manufacturing cost of a camera device are greatly increased.

Accordingly, there is a need for a depth information acquiring method capable of increasing the resolution without significantly increasing the volume and manufacturing cost of the camera device.

DISCLOSURE

Technical Problem

A technical problem to be achieved by the present disclosure is to provide a camera device that extracts depth information using a TOF method and a depth information extraction method thereof.

Technical Solution

A camera device according to an embodiment of the present disclosure may include: a light output unit which outputs an output light signal to be irradiated on an object; A lens unit which includes an infrared (IR) filter and at least one lens arranged on the IR filter, and collects an input light signal reflected from the object; an image sensor which generates an electric signal from the input light signal collected by the lens unit; a tilting unit which shifts an optical path of the input light signal according to a predetermined rule; and an image controller which acquires depth information of the object by using a phase difference between the output light signal and the input light signal received at the image sensor, wherein the image controller may acquire the depth information of the object by using data extracted during a plurality of periods during which the optical path of the input light signal is repeatedly shifted according to the predetermined rule, and the image controller may correct the difference between a preset shift value of the optical path of the input light signal and an actual shift value.

The optical path of the input light signal may, according to the predetermined rule, be shifted in a first direction during a first period based on the preset shift value, be shifted in a second direction perpendicular to the first direction during a second period based on the preset shift value, be shifted in a third direction perpendicular to the second direction during a third period based on the preset shift value, and be shifted in a fourth direction perpendicular to the third direction during a fourth period based on the preset shift value. The image controller may acquire the depth information of the object by fusing a first image obtained from data extracted during the first period, a second image obtained from data extracted during the second period, a third image obtained from data extracted during the third period, and a fourth image obtained from data extracted during the fourth period.

The image controller may include: a shift calculation unit which calculates at least one of an actual shift value of the optical path of the input light signal in the first direction during the first period, an actual shift value of the optical path in the second direction during the second period, an actual shift value of the optical path in the third direction during the third period, or an actual shift value of the optical path in the fourth direction during the fourth period; a comparison unit which compares the actual shift value calculated by the shift calculation unit with the preset shift value; and a correction unit which performs a correction when a difference between the actual shift value calculated by the shift calculation unit and the preset shift value is greater than or equal to a threshold value as a comparison result of the comparison unit.

The correction unit may reset the preset shift value based on the comparison result of the comparison unit and inform the tilting unit of a reset value, and the tilting unit may shift the optical path of the input light signal based on the reset value.

The correction unit may acquire the depth information of the object by applying the comparison result of the comparison unit when fusing the first image, the second image, the third image, and the fourth image.

The shift calculation unit may calculate an actual shift value by comparing at least two of the first image, the second image, the third image, and the fourth image.

The shift calculation unit may calculate a first actual shift value by comparing the first image and the second image, and calculate a second actual shift value by comparing the first image and the third image, and calculate a third actual shift value by comparing the first image and the fourth image.

The shift calculation unit may calculate a first actual shift value by comparing the first image and the second image, calculate a second actual shift value by comparing the second image and the third image, and calculate a third actual shift value by comparing the third image and the fourth image.

The preset shift value may be greater than 0 pixel and less than 1 pixel.

A depth image generating method of a camera device according to an embodiment of the present disclosure may include: outputting an output light signal to irradiate an object, shifting an optical path of an input light signal reflected from the object according to a predetermined rule, and acquiring depth information of the object by using a phase difference between the output light signal and the input light signal, wherein in said acquiring of the depth information of the object, the depth information of the object may be acquired using data extracted during a plurality of periods during which the optical path of the input light signal is repeatedly shifted according to the predetermined rule, and a difference between an actual shift value and a preset shift value of the optical path of the input light signal may be corrected.

Advantageous Effects

Using the camera device according to an embodiment of the present disclosure, depth information may be acquired with high resolution by shifting the optical path of the incident light signal without significantly increasing the number of pixels of the image sensor.

In addition, according to an embodiment of the present disclosure, since a shifted amount of the optical path of the incident light signal may be detected without significantly changing a hardware configuration of the device, the depth information of super-resolution may be acquired.

BEST MODE

Hereinafter, preferred embodiments of the present disclosure will be described in detail with reference to the accompanying drawings.

However, the technical spirit of the present disclosure is not limited to some embodiments to be described, but may be implemented in various different forms, and within the scope of the technical spirit of the present disclosure, one or more components may be selectively combined or substituted between embodiments.

In addition, terms (including technical and scientific terms) used in embodiments of the present disclosure may be interpreted as meanings that can be generally understood by those of ordinary skill in the art to which the present disclosure belongs, unless clearly defined and described, and commonly used terms such as terms defined in the dictionary may be interpreted in consideration of the meanings of the context of the related technology.

In addition, terms used in embodiments of the present disclosure are for describing the embodiments and are not intended to limit the present disclosure.

In the present disclosure, the singular form may include the plural form unless specifically stated in the phrase, and when described as "at least one (or one or more) of A, B, and C", it may include one or more of all combinations that can be combined with A, B, and C.

In addition, a term such as first, second, A, B, (a), or (b) may be used in describing a component in embodiments of the present disclosure.

This term is merely for distinguishing the component from other components, and the nature, turn, or order of the corresponding component is not limited by the term.

Further, when a component is described as being 'connected', 'coupled', or 'accessed' to another component, it may include not only a case where the component is directly connected, coupled, or accessed to the another component, but also a case where the component is connected, coupled, or accessed to the another component through still another component disposed between the component and the another component.

Furthermore, when it is described as being formed or disposed on the "top (on) or bottom (under)" of each component, it may include not only a case where two components are in direct contact with each other, but also a case where one or more other components are formed or disposed between the two components. In addition, when expressed as "up (above) or down (under)", it may include not only an upward direction but also a downward direction with respect to one component.

Figure 1:
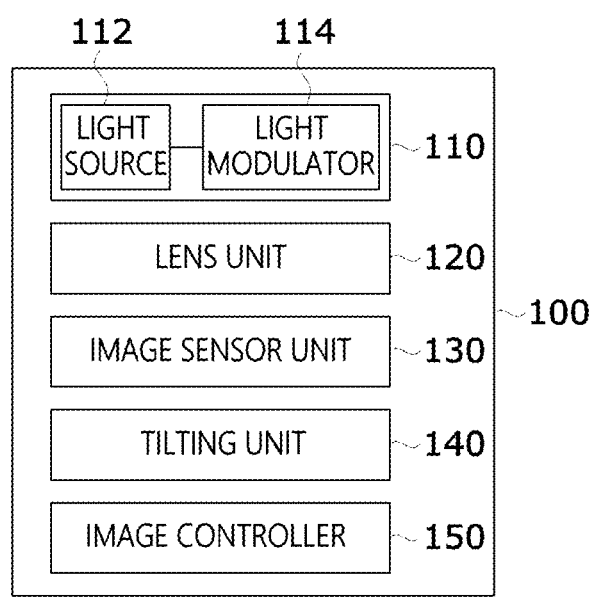
FIG. 1 is a block diagram of a ToF camera module according to an embodiment of the present disclosure.

FIG. 1 is a block diagram of a ToF camera module according to an embodiment of the present disclosure.

Referring to FIG. 1, a ToF camera module 100 includes a light output unit 110, a lens unit 120, an image sensor unit 130, a tilting unit 140, and an image controller 150.

The light output unit 110 generates an output light signal and then irradiates an object. In this case, the light output unit 110 may generate and output the output light signal in the form of a pulse wave or a continuous wave. The continuous wave may be in the form of a sinusoid wave or a squared wave. By generating the output light signal in the form of a pulse wave or a continuous wave, the ToF camera module 100 may detect a phase difference between the output light signal outputted from the light output unit 110 and an input light signal inputted to the ToF camera module 100 after being reflected from the object. Herein, output light may refer to light that is outputted from the light output unit 110 and incident on the object, and input light may refer to light that is outputted from the light output unit 110, reaches the object, is reflected from the object, and is then inputted to the ToF camera module 100. From the point of view of the object, the output light may be incident light and the input light may be reflected light.

The light output unit 110 irradiates the object with the generated output light signal during a predetermined integration time. Here, the integration time means one frame period. When generating a plurality of frames, an established integration time is repeated. For example, when the ToF camera module 100 photographs the object at 20 FPS, the integration time is 1/20 [sec]. In addition, when 100 frames are generated, the integration time may be repeated 100 times.

The light output unit 110 may generate a plurality of output light signals having different frequencies. The light output unit 110 may sequentially repeatedly generate the plurality of output light signals having different frequencies. Alternatively, the light output unit 110 may simultaneously generate the plurality of output light signals having different frequencies.

Figure 2:
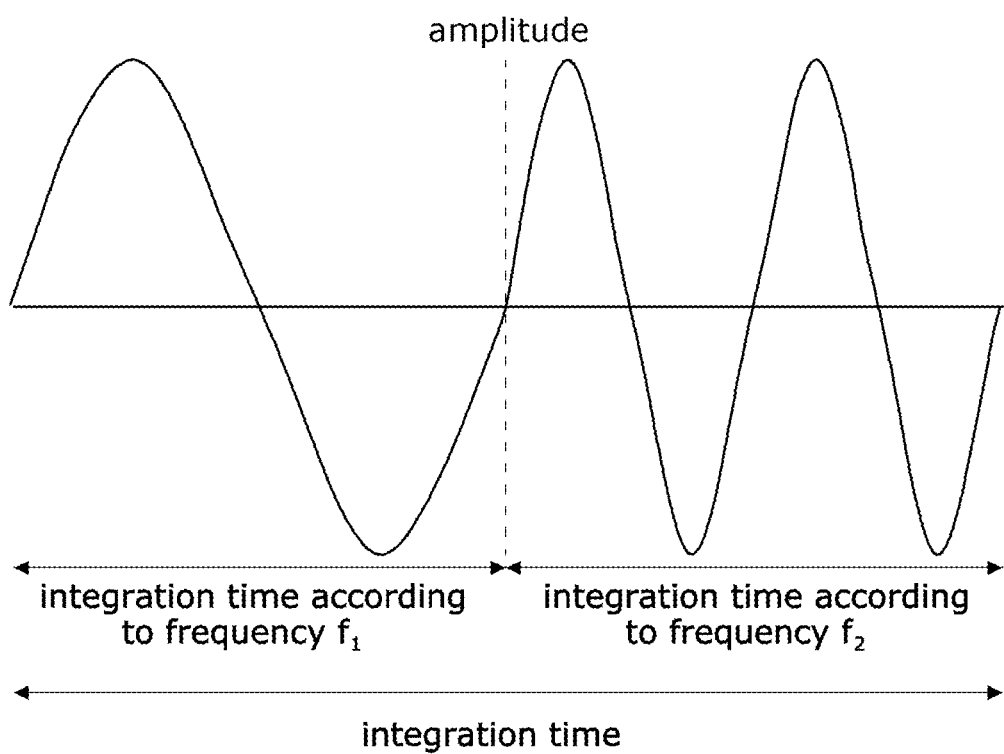
FIG. 2 is a diagram for describing a frequency of an output light signal.

FIG. 2 is a diagram for describing a frequency of an output light signal. According to an embodiment of the present disclosure, as shown in FIG. 2, the light output unit 110 may generate the output light signal having a frequency $f_1$ during the first half of the integration time, and generate the output light signal having a frequency $f_2$ during the other half of the integration time.

According to another embodiment, the light output unit 110 may control some of a plurality of light emitting diodes to generate the output light signal having a frequency $f_1$, and control the remaining light emitting diodes to generate the output light signal having a frequency $f_2$.

To this end, the light output unit 110 may include a light source 112 that generates light and a light modulator 114 that modulates light.

First, the light source 112 generates light. The light generated by the light source 112 may be infrared rays having a wavelength of 770 to 3000 nm, or visible light having a wavelength of 380 to 770 nm. The light source 112 may use the light emitting diode (LED), and may have a shape in which the plurality of light emitting diodes are arranged according to a predetermined pattern. Further, the light source 112 may include an organic light emitting diode (OLED) or a laser diode (LD). Alternatively, the light source 112 may be a vertical cavity surface emitting laser (VCSEL). The VCSEL is one of laser diodes that convert an electric signal into a light signal, and may use a wavelength of about 800 to 1000 nm, for example, about 850 nm or about 940 nm.

The light source 112 generates the output light signal in the form of a pulse wave or a continuous wave by repeatedly turning on/off at a predetermined time interval. The predetermined time interval may be the frequency of the output light signal. Turning on/off the light source may be controlled by the light modulator 114.

The light modulator 114 controls the on/off of the light source 112 so that the light source 112 generates the output light signal in the form of a continuous wave or a pulse wave. The light modulator 114 may control the light source 112 to generate the output light signal in the form of a continuous wave or a pulse wave through a frequency modulation or pulse modulation.

Meanwhile, the lens unit 120 collects the input light signal reflected from the object and transmits it to the image sensor 130.

Figure 3:
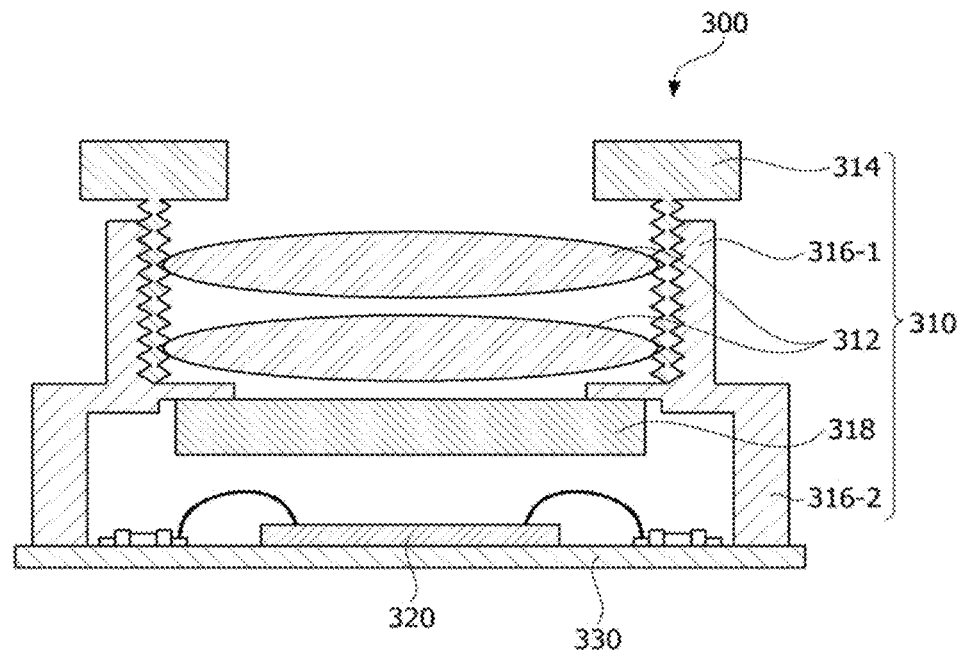
FIG. 3 is an example of a cross-sectional view of a camera module.

FIG. 3 is an example of a cross-sectional view of a camera module.

Referring to FIG. 3, the camera module 300 includes a lens assembly 310, an image sensor 320, and a printed circuit board 330. Here, the lens assembly 310 may correspond to the lens unit 120 of FIG. 1, and the image sensor 320 may correspond to the image sensor unit 130 of FIG. 1. In addition, the image controller 150 and the like of FIG. 1 may be implemented in the printed circuit board 330. Although not shown, the light output unit 110 of FIG. 1 may be disposed on the side surface of the image sensor 320 on the printed circuit board 330 or may be disposed outside the camera module 300, for example, on the side surface of the camera module 300.

The lens assembly 310 may include a lens 312, a lens barrel 314, a lens holder 316, and an IR filter 318.

A plurality of lenses 312 may be provided, or one lens 312 may be provided. When the plurality of lenses 312 are provided, all lenses may be aligned with respect to a central axis to form an optical system. Here, the central axis may be the same as an optical axis of the optical system.

The lens barrel 314 may be coupled to the lens holder 316, and a space for accommodating a lens may be provided therein. The lens barrel 314 may be rotationally coupled to one or a plurality of lenses, but this is exemplary, and may be coupled in other ways such as a method using an adhesive (e.g., an adhesive resin such as epoxy).

The lens holder 316 may be coupled to the lens barrel 314 to support the lens barrel 314, and may be coupled to the printed circuit board 330 on which the image sensor 320 is mounted. A space in which the IR filter 318 can be attached may be formed under the lens barrel 314 by the lens holder 316. The lens holder 316 may have a helical pattern formed on its inner circumferential surface, and may be rotationally coupled to the lens barrel 314 having a helical pattern in the same manner on its outer circumferential surface. However, this is exemplary, and the lens holder 316 may be coupled to and the lens barrel 314 through an adhesive, or the lens holder 316 may be formed integrally with the lens barrel 314.

The lens holder 316 may be divided into an upper holder 316-1 coupled to the lens barrel 314 and a lower holder 316-2 coupled to the printed circuit board 330 on which the image sensor 320 is mounted. The upper holder 316-1 and the lower holder 316-2 may be integrally formed, may be formed separately from each other and then fastened or coupled, or may have a structure separated from each other with a space therebetween. In this case, the diameter of the upper holder 316-1 may be smaller than the diameter of the lower holder 316-2.

The above example is merely one embodiment, and the lens unit 120 may be configured with another structure capable of condensing the input light signal incident on the ToF camera module 100 and transmitting it to the image sensor unit 130.

Referring back to FIG. 1, the image sensor unit 130 generates an electric signal using the input light signal collected through the lens unit 120.

The image sensor unit 130 may be synchronized with an on/off period of the light output unit 110 to absorb the input light signal. Specifically, the image sensor unit 130 may absorb light at each of in-phase and out-phase with the output light signal outputted from the light output unit 110. That is, the image sensor unit 130 may repeatedly perform a step of absorbing the incident light signal while the light source is turned on and a step of absorbing the incident light signal while the light source is turned off.

Next, the image sensor unit 130 may use a plurality of reference signals having different phase differences to generate an electric signal corresponding to each reference signal. The frequency of the reference signal may be set equal to the frequency of the output light signal outputted from the light output unit 110. Accordingly, when the light output unit 110 generates the output light signal at a plurality of frequencies, the image sensor unit 130 generates an electric signal using a plurality of reference signals corresponding to each frequency. The electric signal may include information on the amount of charge or voltage corresponding to each reference signal.

Figure 4:
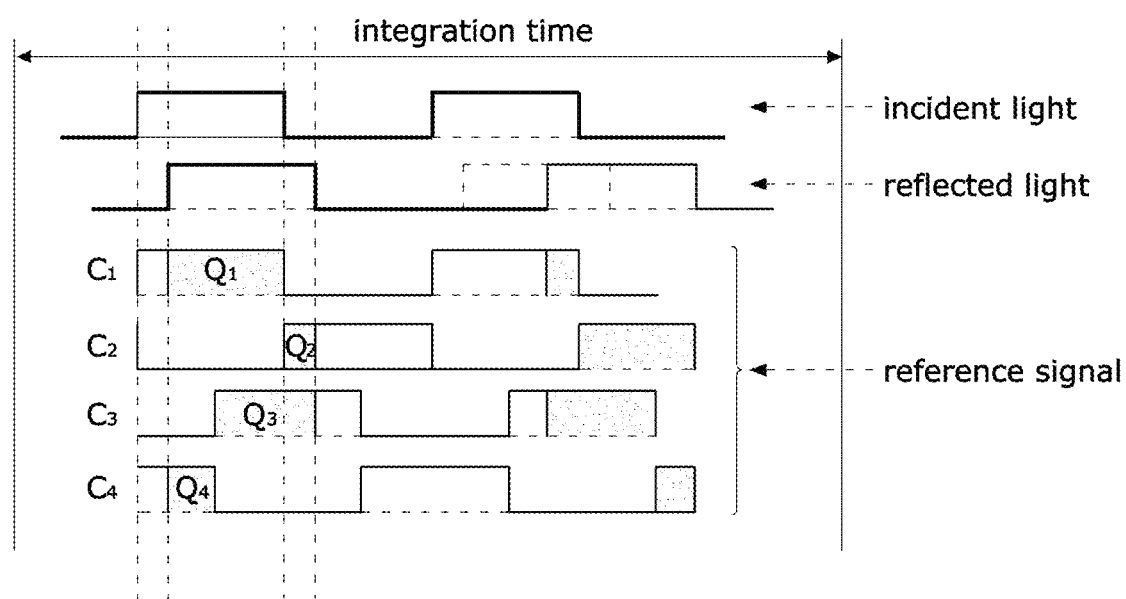
FIG. 4 is a diagram for describing a process of generating an electric signal according to an embodiment of the present disclosure.

FIG. 4 is a diagram for describing a process of generating an electric signal according to an embodiment of the present disclosure.

As shown in FIG. 4, there may be four reference signals $C_1$ to $C_4$ according to an embodiment of the present disclosure. The reference signals $C_1$ to $C_4$ may each have the same frequency as the output light signal, but may have a phase difference of 90 degrees from each other. One reference signal $C_1$ of the four reference signals may have the same phase as the output light signal. The phase of the input light signal is delayed by a distance by which the output light signal is incident on the object and returned by being reflected. The image sensor unit 130 mixes the input light signal with each reference signal. Then, the image sensor unit 130 may generate an electric signal corresponding to a shaded portion of FIG. 4 for each reference signal.

In another embodiment, when the output light signal is generated at a plurality of frequencies during an integration time, the image sensor unit 130 absorbs the input light signal according to the plurality of frequencies. For example, it is assumed that the output light signal is generated at frequencies $f_1$ and $f_2$, and a plurality of reference signals have a phase difference of 90 degrees. Then, since the incident light signal also has the frequencies $f_1$ and $f_2$, four electric signals may be generated through the input light signal having a frequency of $f_1$ and four reference signals corresponding thereto. In addition, four electric signals may be generated through the input light signal having a frequency of $f_2$ and four reference signals corresponding thereto. Thus, a total of 8 electric signals may be generated.

The image sensor unit 130 may be configured in a structure in which a plurality of pixels are arranged in a grid form. The image sensor unit 130 may be a complementary metal oxide semiconductor (CMOS) image sensor, or may be a charge coupled device (CCD) image sensor. In addition, the image sensor unit 130 may include a ToF sensor that receives infrared light reflected from a subject and measures a distance using time or phase difference.

Figure 5:
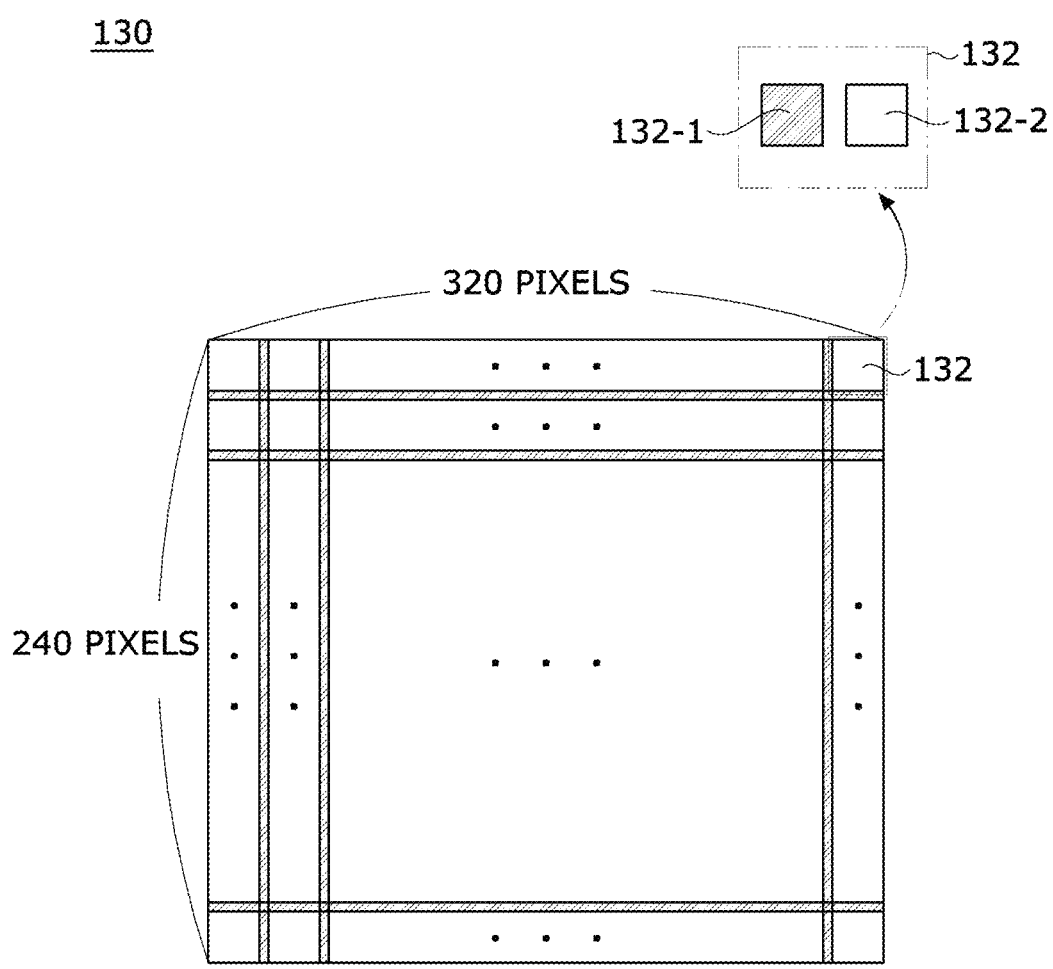
FIG. 5 is a diagram for describing an image sensor according to an embodiment of the present disclosure.

FIG. 5 is a diagram for describing an image sensor according to an embodiment of the present disclosure. For example, as shown in FIG. 5, in the case of the image sensor unit 130 having a resolution of 320×240, 76,800 pixels are arranged in a grid form. In this case, a constant gap may be formed between the plurality of pixels as in the shaded portion of FIG. 5. In an embodiment of the present disclosure, one pixel will be described as including the constant gap adjacent to the pixel.

According to an embodiment of the present disclosure, each pixel 132 may include a first light receiving unit 132-1 including a first photodiode and a first transistor, and a second light receiving unit 132-2 including a second photodiode and a second transistor.

The first light receiving unit 132-1 receives the input light signal at the same phase as the waveform of the output light. In other words, while the light source is turned on, the first photodiode is turned on to absorb the input light signal. In addition, while the light source is turned off, the first photodiode is turned off to stop absorbing the input light signal. The first photodiode converts the absorbed input light signal into current and transfers it to the first transistor. The first transistor converts the received current into an electric signal and outputs it.

The second light receiving unit 132-2 receives the input light signal at a phase opposite to the waveform of the output light. In other words, while the light source is turned on, the second photodiode is turned off to absorb the input light signal. In addition, while the light source is turned off, the second photodiode is turned on to stop absorbing the input light signal. The second photodiode converts the absorbed input light signal into current and transfers it to the second transistor. The second transistor converts the received current into an electric signal.

Accordingly, the first light receiving unit 132-1 may be referred to as an in-phase receiving unit, and the second light receiving unit 132-2 may be referred to as an out-phase receiving unit. As such, when the first light receiving unit 132-1 and the second light receiving unit 132-2 are activated with a time difference, the difference occurs in the amount of received light depending on the distance to the object. For example, when the object is right in front of the TOF camera module 100 (i.e., when the distance is 0), since the time it takes for light to return by being reflected from the object after the light is outputted from the light output unit 110 is 0, the on/off period of the light source becomes a light receiving period as it is. Accordingly, only the first light receiving unit 132-1 receives the light, and the second light receiving unit 132-2 does not receive the light. As another example, if the object is located at a predetermined distance away from the ToF camera module 100, since it takes time for light to return by being reflected from the object after the light is outputted from the light output unit 110, the on/off period of the light source is different from the light receiving period. Accordingly, the difference occurs in the amounts of light received by the first light receiving unit 132-1 and the second light receiving unit 132-2. Thus, the distance to the object may be calculated using the difference between the amounts of light inputted to the first light receiving unit 132-1 and the second light receiving unit 132-2. Referring back to FIG. 1, the image controller 150 calculates a phase difference between the output light and the input light using the electric signal received from the image sensor unit 130 and calculates the distance between the object and the ToF camera module 100 using the phase difference.

Specifically, the image controller 150 may calculate a phase difference between the output light and the input light using information on the amount of charge of the electric signal.

As described above, four electric signals may be generated for each frequency of the output light signal. Accordingly, the image controller 150 may calculate a phase difference to between the output light signal and the input light signal by using Equation 1 below.

$$t_d = \arctan\left(\frac{Q_3 - Q_4}{Q_1 - Q_2}\right)$$ [Equation 1]

Here, $Q_1$ to $Q_4$ are the amounts of charge of the four electric signals, respectively. $Q_1$ is the amount of charge of the electric signal corresponding to the reference signal of the same phase as the output light signal. $Q_2$ is the amount of charge of the electric signal corresponding to the reference signal whose phase is 180 degrees slower than the output light signal. $Q_3$ is the amount of charge of the electric signal corresponding to the reference signal whose phase is 90 degrees slower than the output light signal. $Q_4$ is the amount of charge of the electric signal corresponding to the reference signal whose phase is 270 degrees slower than the output light signal.

Then, the image controller 150 may calculate the distance between the object and the ToF camera module 100 by using the phase difference between the output light signal and the input light signal. In this case, the image controller 150 may calculate a distance d between the object and the ToF camera module 100 using Equation 2 below.

$$d = \frac{c}{2f} \frac{t_d}{2\pi}$$ [Equation 2]

Here, c is the speed of light and f is the frequency of the output light.

According to an embodiment of the present disclosure, a ToF IR image and a depth image may be obtained from the ToF camera module 100.

Figure 6:
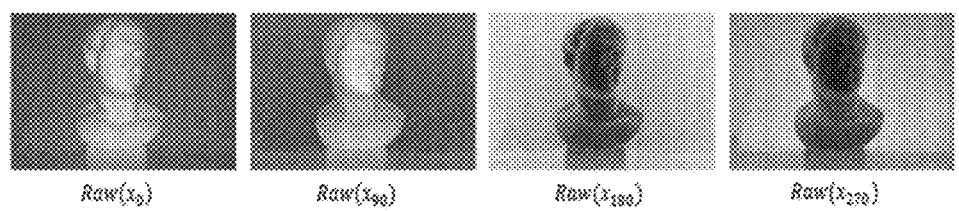
FIG. 6 shows an example of a phase image.

More specifically in this regard, as illustrated in FIG. 6, raw images for four phases may be obtained from the ToF camera module 100 according to an embodiment of the present disclosure. Here, the four phases may be 0°, 90°, 180°, and 270°, the raw image for each phase may be an image consisting of digitized pixel values for each phase and may be used interchangeably with a phase image, a phase IR image, or the like.

Figure 7:
FIG. 7 shows an example of an amplitude image.

If calculated as in Equation 3 below using the four phase images of FIG. 6, an amplitude image, which is the ToF IR image of FIG. 7, may be obtained.

Amplitude= [Equation 3]

$$\frac{1}{2}\sqrt{(\text{Raw}(x_{90}) - \text{Raw}(x_{270}))^2 + (\text{Raw}(x_{180}) - \text{Raw}(x_0))^2}$$

Here, Raw($x_0$) may be a data value for each pixel received by the sensor at phase 0°, Raw($x_{90}$) may be a data value for each pixel received by the sensor at phase 90°. Raw(x180) may be a data value for each pixel received by the sensor at phase 180°, and Raw($x_{270}$) may be a data value for each pixel received by the sensor at phase 270°.

Alternatively, if calculated as in Equation 4 below using the four phase images of FIG. 6, an intensity image, which is another ToF IR image, may be obtained.

Intensity=|Raw($x_{90}$)−Raw($x_{270}$)|+|Raw($x_{180}$)−Raw($x_0$)| [Equation 4]

Here, Raw($x_0$) may be a data value for each pixel received by the sensor at phase 0°, Raw($x_{90}$) may be a data value for each pixel received by the sensor at phase 90°, Raw($x_{180}$) may be a data value for each pixel received by the sensor at phase 180°, and Raw($x_{270}$) may be a data value for each pixel received by the sensor at phase 270°.

As such, the ToF IR image is an image generated by a process of subtracting two of the four phase images from each other, and in this process, background light may be removed. As a result, only the signal in a wavelength band outputted from the light source remains in the ToF IR image, thereby increasing the IR sensitivity to the object and reducing noise significantly.

Herein, the ToF IR image may refer to the amplitude image or the intensity image, and the intensity image may be used interchangeably with a confidence image. As shown in FIG. 7, the ToF IR image may be a gray image.

Figure 8:
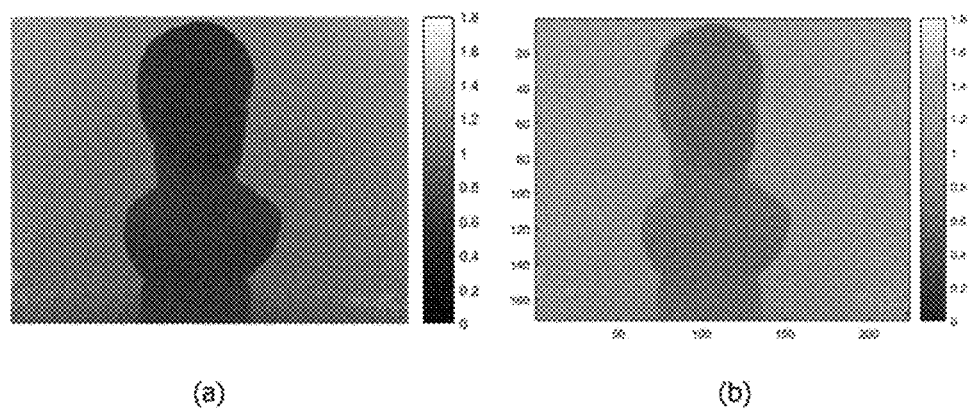
FIG. 8 shows an example of a depth image, which are obtained from a ToF camera module according to an embodiment of the present disclosure.

Meanwhile, if calculated as in Equations 5 and 6 below using the four phase images of FIG. 6, a depth image of FIG. 8 may also be obtained.

$$\text{Phase} = \arctan\left(\frac{\text{Raw}(x_{90}) - \text{Raw}(x_{270})}{\text{Raw}(x_{180}) - \text{Raw}(x_0)}\right)$$ [Equation 5]

$$\text{Depth} = \frac{1}{2f} c \frac{\text{Phase}}{2\pi} (c = \text{speed of light})$$ [Equation 6]

Meanwhile, in an embodiment of the present disclosure, in order to increase the resolution of the depth image, a super-resolution (SR) technique is used. The SR technique is a technique for obtaining a high resolution image from a plurality of low resolution images, and a mathematical model of the SR technique may be expressed as Equation 7.

$$y_K = D_K B_K M_K x + n_K$$ [Equation 7]

Here, 1≤k≤p, p is the number of low-resolution images, $y_k$ is a low-resolution image (=[$y_{k,1}$, $y_{k,2}$, . . . , $y_{k,M}$]$^T$, where M=$N_1$*$N_2$), $D_k$ is a down sampling matrix, $B_k$ is an optical blur matrix, $M_k$ is an image warping matrix, x is a high resolution image (=[$x_1$, $x_2$, . . . , $x_N$]$^T$, where N=$L_1N_1$*$L_2N_2$), and $n_k$ is a noise. That is, according to the SR technique, it refers to a technique of estimating x by applying the inverse function of estimated resolution degradation factors to $y_k$. The SR technique may be largely divided into a statistical scheme and a multiframe scheme, and the multiframe scheme may be largely divided into a space division scheme and a time division scheme. When the SR technique is used to acquire the depth image, since the inverse function of $M_k$ in Equation 1 does not exist, the statistical scheme may be attempted. However, in the case of the statistical scheme, since an iterative calculation process is required, there is a problem of low efficiency.

In order to apply the SR technique to extracting depth information, the image controller 150 may generate a plurality of low-resolution subframes using the electric signal received from the image sensor unit 130, and then may use the plurality of low-resolution subframes to extract a plurality of low-resolution depth information. In addition, high-resolution depth information may be extracted by rearranging the pixel values of the plurality of low-resolution depth information.

Here, the term 'high resolution' is used in a relative meaning indicating a resolution higher than a low resolution.

Here, the subframe may mean image data generated from an electric signal corresponding to any one integration time and reference signal. For example, when the electric signal is generated through eight reference signals in a first integration time, i.e., in one image frame, eight subframes may be generated, and one start of frame may further be generated. Herein, the subframe may be used interchangeably with image data, subframe image data, or the like.

Alternatively, in order to apply the SR technique according to an embodiment of the present disclosure to extracting depth information, the image controller 150 may generate a plurality of low-resolution subframes using the electric signal received from the image sensor unit 130, and then may rearrange the pixel values of the plurality of low-resolution subframes to generate a plurality of high-resolution subframes. In addition, high-resolution depth information may be extracted by using the high-resolution subframes.

To this end, a pixel shift technique may be used. Specifically, after acquiring several image data shifted by a subpixel for each subframe using the pixel shift technology, a plurality of high-resolution subframe image data may be obtained by applying the SR technique to each subframe, and then using the image data, a high-resolution depth image may be extracted. For pixel shifting, the ToF camera module 100 according to an embodiment of the present disclosure includes the tilting unit 140.

Referring back to FIG. 1, the tilting unit 140 changes at least one optical path of the output light signal or the input light signal in the unit of a subpixel of the image sensor unit 130. Here, the subpixel may be a unit larger than 0 pixel and smaller than 1 pixel.

The tilting unit 140 changes at least one optical path of the output light signal or the input light signal for each image frame. As described above, one image frame may be generated per one integration time. Accordingly, when one integration time ends, the tilting unit 140 changes at least one optical path of the output light signal or the input light signal.

The tilting unit 140 changes at least one optical path of the output light signal or the input light signal by a subpixel unit based on the image sensor unit 130. In this case, the tilting unit 140 changes at least one optical path of the output light signal or the input light signal in any one of upward, downward, left, and right directions with respect to a current optical path.

Figure 9:
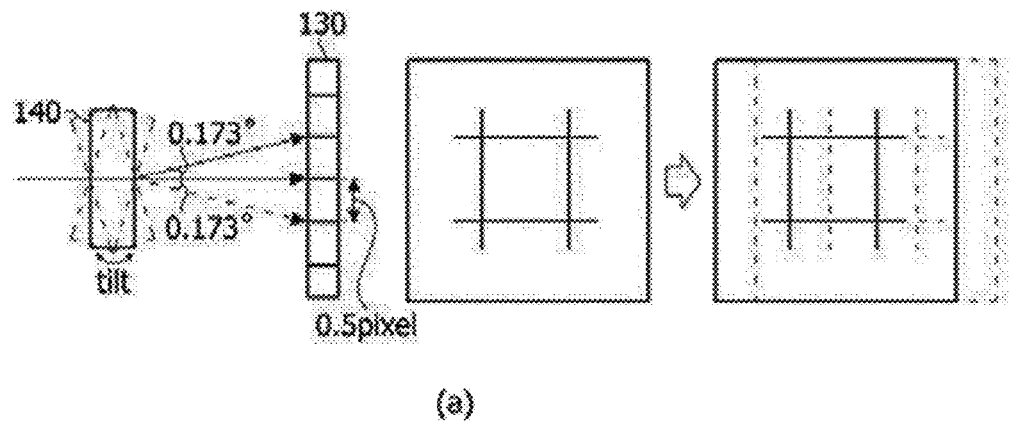
FIG. 9 is a diagram for describing a change in an optical path of an input light signal by a tilting unit.
Figure 9:
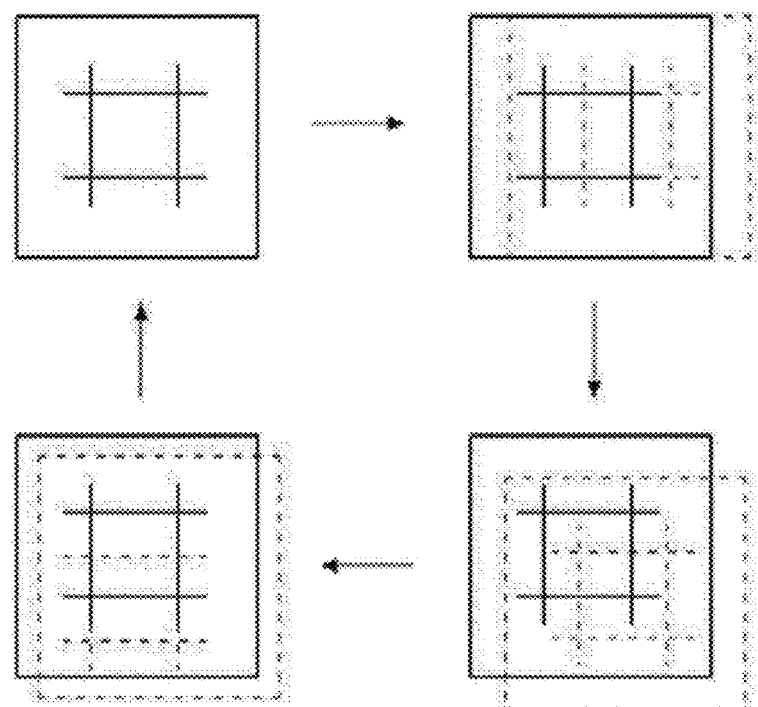

FIG. 9 is a diagram for describing a change in an optical path of an input light signal by a tilting unit.

In (a) of FIG. 9, a portion indicated by a solid line depicts a current optical path of the input light signal, and a portion indicated by a dotted line depicts a changed optical path. When the integration time corresponding to the current optical path ends, the tilting unit 140 may change the optical path of the input light signal as shown in the dotted line. Then, the path of the input light signal is shifted by the subpixel from the current optical path. For example, as shown in (a) of FIG. 9, when the tilting unit 140 moves the current optical path to the right by 0.173 degrees, the input light signal incident on the image sensor unit 130 may move to the right by 0.5 pixels (subpixel).

According to an embodiment of the present disclosure, the tilting unit 140 may change the optical path of the input light signal clockwise from a reference position. For example, as shown in (b) of FIG. 9, after the first integration time ends, the tilting unit 140 moves the optical path of the input light signal to the right by 0.5 pixels based on the image sensor unit 130 in a second integration time. In addition, the tilting unit 140 moves the optical path of the input light signal downward by 0.5 pixels based on the image sensor unit 130 in a third integration time. In addition, the tilting unit 140 moves the optical path of the input light signal to the left by 0.5 pixels based on the image sensor unit 130 in a fourth integration time. In addition, the tilting unit 140 moves the optical path of the input light signal upward by 0.5 pixels based on the image sensor unit 130 in a fifth integration time. That is, the tilting unit 140 may move the optical path of the input light signal to the original position in four integration times. This may be applied equally to moving the optical path of the output light signal, and thus a detailed description thereof will be omitted. In addition, it is merely an example that the change pattern of the optical path is clockwise, and it may be counterclockwise.

Meanwhile, the subpixel may be larger than 0 pixel and smaller than 1 pixel. For example, the subpixel may have a size of 0.5 pixels, or may have a size of ⅓ pixels. The size of the subpixel may be changed in design by a person skilled in the art.

Figure 10:
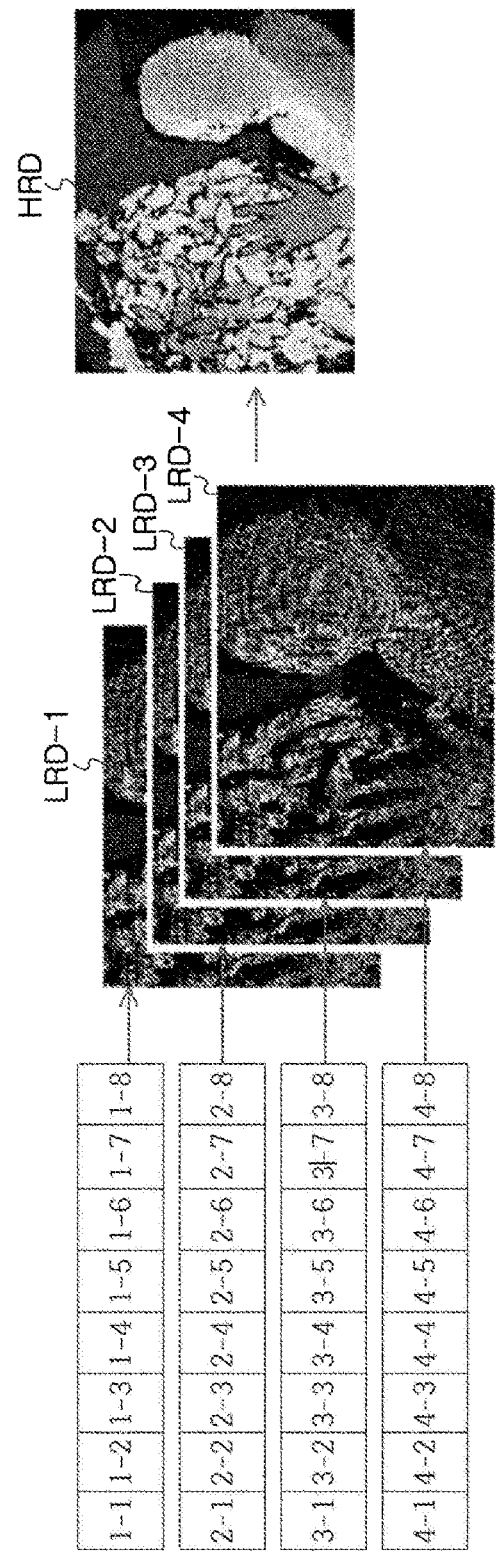
FIGS. 10 and 11 are diagrams for describing an SR scheme according to an embodiment of the present disclosure.
Figure 11:
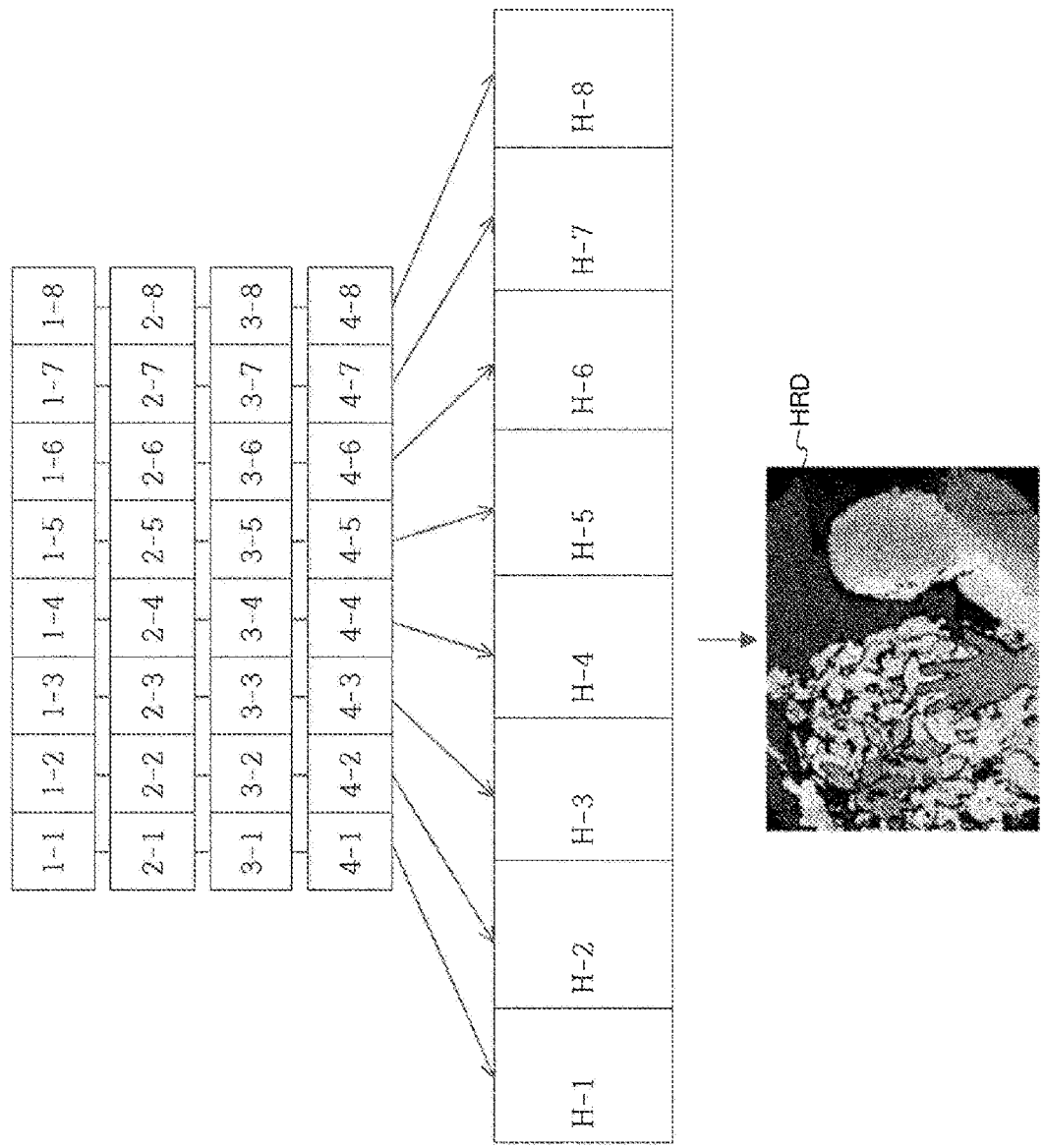

FIGS. 10 and 11 are diagrams for describing an SR scheme according to an embodiment of the present disclosure.

Referring to FIG. 10, the image controller 150 may extract a plurality of low-resolution depth information using a plurality of low-resolution subframes generated in the same integration time, i.e., in the same frame. In addition, the image controller 150 may extract high-resolution depth information by rearranging the pixel values of the plurality of low-resolution depth information. Here, optical paths of the output light signal or the input light signal corresponding to the plurality of low-resolution depth information may be different from each other.

For example, the image controller 150 may generate low-resolution subframes 1-1 to 4-8 using a plurality of electric signals. The low-resolution subframes 1-1 to 1-8 are low-resolution subframes generated in the first integration time. The low-resolution subframes 2-1 to 2-8 are low-resolution subframes generated in the second integration time. The low-resolution subframes 3-1 to 3-8 are low-resolution subframes generated in the third integration time. The low-resolution subframes 4-1 to 4-8 are low-resolution subframes generated in the fourth integration time. Then, the image controller 150 extracts low-resolution depth information LRD-1 to LRD-4 by applying a depth information extraction technique to the plurality of low-resolution subframes generated in each integration time. The low-resolution depth information LRD-1 is low-resolution depth information extracted using the subframes 1-1 to 1-8. The low-resolution depth information LRD-2 is low-resolution depth information extracted using the subframes 2-1 to 2-8. The low-resolution depth information LRD-3 is low-resolution depth information extracted using the subframes 3-1 to 3-8. The Low-resolution depth information LRD-4 is low-resolution depth information extracted using the subframes 4-1 to 4-8. Then, the image controller 150 rearranges the pixel values of the low-resolution depth information LRD-1 to LRD-4 to extract high-resolution depth information HRD.

Alternatively, as described above, the image controller 150 may generate a high resolution subframe by rearranging the pixel values of a plurality of subframes corresponding to the same reference signal. In this case, the optical paths of the output light signal or input light signal corresponding to the plurality of subframes are different. In addition, the image controller 150 may extract high-resolution depth information using a plurality of high-resolution subframes.

For example, in FIG. 11, the image controller 150 generates low-resolution subframes 1-1 to 4-8 using a plurality of electric signals. The low-resolution subframes 1-1 to 1-8 are low-resolution subframes generated in a first integration time. The low-resolution subframes 2-1 to 2-8 are low-resolution subframes generated in a second integration time. The low-resolution subframes 3-1 to 3-8 are low-resolution subframes generated in a third integration time. The low-resolution subframes 4-1 to 4-8 are low-resolution subframes generated in a fourth integration time. Here, the low-resolution subframes 1-1, 2-1, 3-1, and 4-1 correspond to the same reference signal $C_1$, but correspond to different optical paths. Then, the image controller 150 may rearrange the pixel values of the low resolution subframes 1-1, 2-1, 3-1, and 4-1 to generate high resolution subframe H-1. When high resolution subframes H-1 to H-8 are generated through the pixel value rearrangement, the image controller may extract the high resolution depth information HRD by applying the depth information extraction technique to the high resolution subframes H-1 to H-8.

Figure 12:
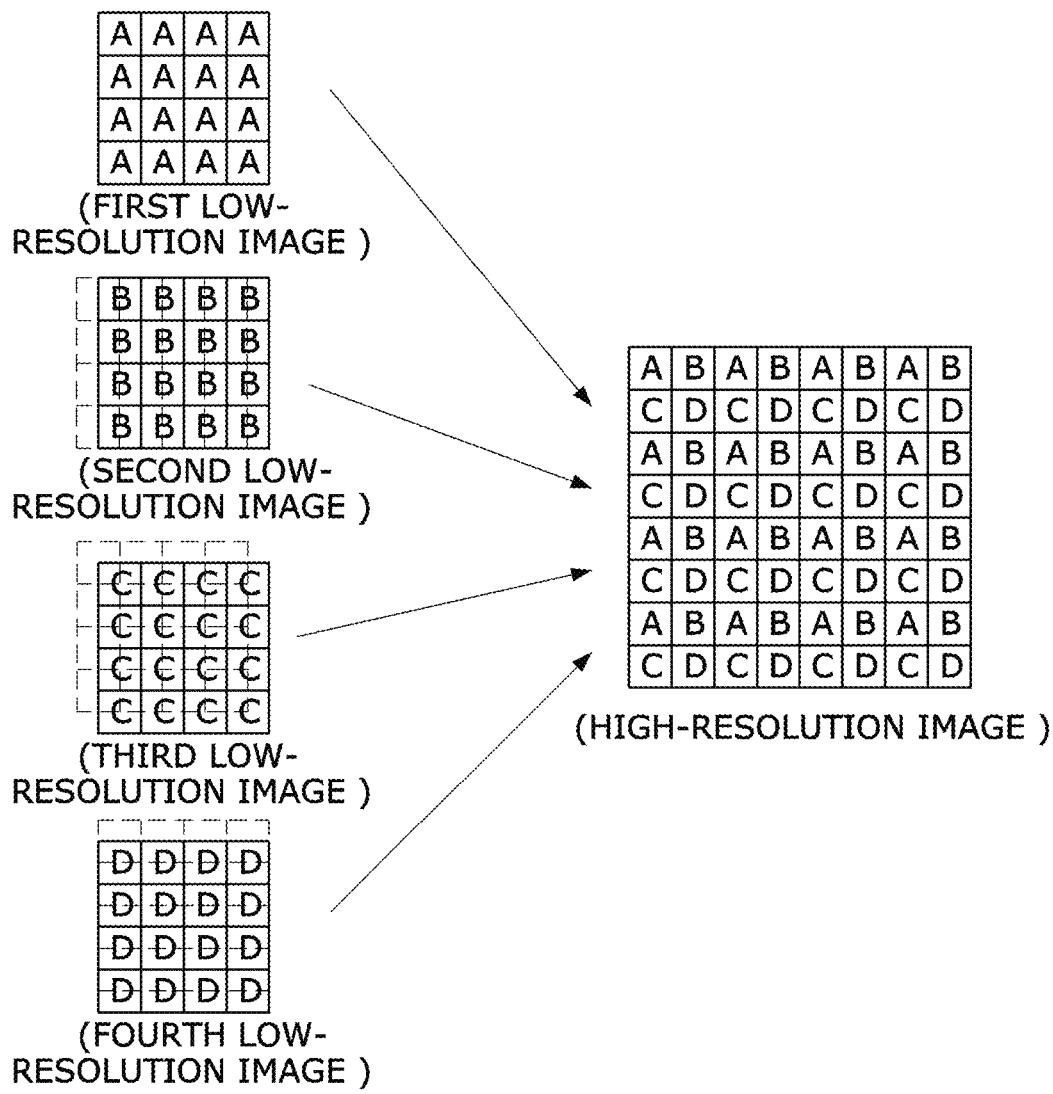
FIG. 12 is a diagram for describing a pixel value arrangement process according to an embodiment of the present disclosure.

FIG. 12 is a diagram for describing a pixel value arrangement process according to an embodiment of the present disclosure.

Here, it is assumed that one 8×8 high-resolution image is generated using four 4×4 low-resolution images. In this case, a high-resolution pixel grid has 8×8 pixels, which are the same as pixels of the high resolution image. Here, the low-resolution image may mean including a low-resolution subframe and low-resolution depth information, and the high-resolution image may mean including a high-resolution subframe and high-resolution depth information.

In FIG. 12, first to fourth low-resolution images are images captured by moving the optical path in the unit of a subpixel having a size of 0.5 pixels. The image controller 150 arranges the pixel values of the second to fourth low-resolution images to fit the high-resolution image along the moving direction of the optical path with respect to the first low-resolution image in which the optical path has not moved.

Specifically, the second low-resolution image is an image shifted to the right by the subpixel from the first low-resolution image. Therefore, a pixel B of the second low-resolution image is disposed in a pixel located to the right of each pixel A of the first low-resolution image.

The third low-resolution image is an image shifted downward by the subpixel from the second low-resolution image. Therefore, a pixel C of the third low-resolution image is disposed in a pixel located under each pixel B of the second low-resolution image.

The fourth low-resolution image is an image shifted to the left by the subpixel from the third low-resolution image. Therefore, a pixel D of the fourth low-resolution image is disposed in a pixel located to the left of each pixel C of the third low-resolution image.

When all pixel values of the first to fourth low-resolution images are rearranged in the high-resolution pixel grid, a high-resolution image frame with a resolution of 4 times higher than that of the low-resolution image is generated.

Meanwhile, the image controller 150 may apply a weight to the arranged pixel values. In this case, the weight may be set differently depending on the size of the subpixel or the moving direction of the optical path, and may be set differently for each low-resolution image.

According to one embodiment, the tilting unit 140 may shift the input light signal by controlling the tilt of the lens assembly, e.g., the IR filter 318 (see FIG. 2) included in the lens assembly, and accordingly may obtain data shifted by the subpixel.

Figure 13:
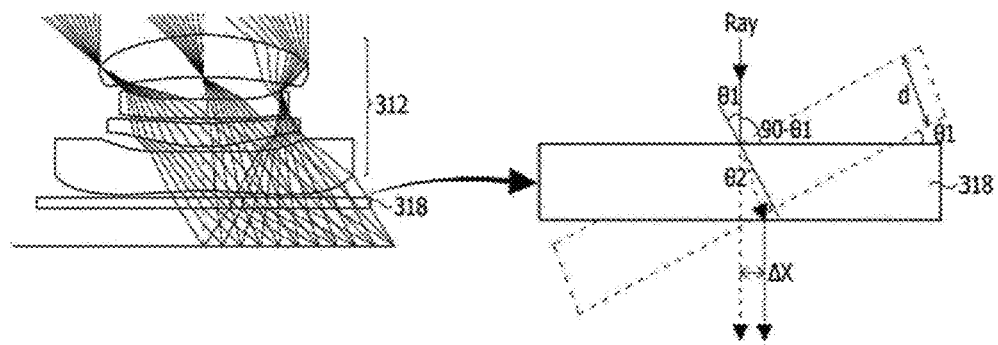
FIGS. 13 and 14 are diagrams for describing an effect that an image frame inputted onto an image sensor is shifted by a tilt control of an IR filter.
Figure 14:
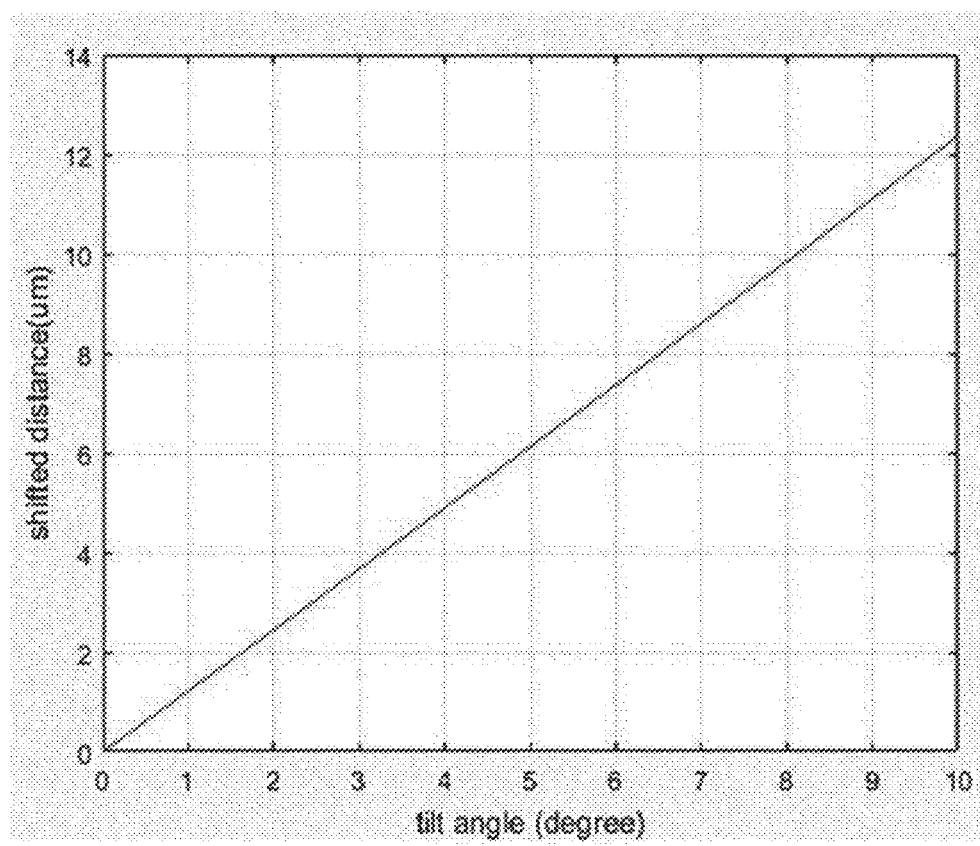

FIGS. 13 and 14 are diagrams for describing an effect that an image frame inputted onto an image sensor is shifted by a tilt control of an IR filter. FIG. 14 shows a simulation result of a shift distance with respect to a tilt angle under the condition that the thickness of the IR filter is 0.21 mm and the refractive index of the IR filter is 1.5.

Referring to FIG. 13 and Equation 8 below, a slope $\theta_i$ of the IR filter 318 and a shift distance may have the following relationship.

$$\Delta x = d\cos\theta_1 \left( \frac{1}{\tan(90° - \theta_1)} - \frac{1}{\tan(90° - \theta_2)} \right) \quad \text{[Equation 8]}$$

Here, $\theta_2$ may be expressed as in Equation 9.

$$\theta_2 = \sin^{-1}\left( \frac{\sin\theta_1}{n_g} \right) \quad \text{[Equation 9]}$$

Wherein, $\theta_1$ is a slope, i.e., a tilt angle of the IR filter 318, $n_g$ is a refractive index of the IR filter 318, and d is a thickness of the IR filter 318. For example, referring to Equations 8 and 9, the IR filter 318 may be tilted by about 5' to 6° in order to shift the image frame inputted onto the image sensor by 7 μm. In this case, the vertical displacement of the IR filter 318 may be about 175 to 210 μm.

In this way, by controlling the slope of the IR filter 318, it is possible to obtain shifted image data without tilting the image sensor 320 itself.

According to an embodiment of the present disclosure, the tilting unit for controlling the slope of the IR filter may include an actuator connected directly or indirectly to the IR filter, and the actuator may include at least one of micro electro mechanical systems (MEMS), a voice coil motor (VCM), or a piezoelectric element.

In this case, as described above, the size of the subpixel is larger than 0 pixel and smaller than 1 pixel, and a very precise control is required to shift the input light signal within this range. When the IR filter is tilted using the actuator, the slope of the IR filter tilted and the shift value of the input light signal may differ from preset values according to the accuracy of the actuator. In particular, when an error or a failure occurs during the operation of the actuator, or the alignment between parts is misaligned due to a long life of the actuator, an error in the slope of the IR filter and the shift value of the input light signal may become very large.

According to an embodiment of the present disclosure, the optical path of the input light is shifted in the unit of a subpixel using the tilting unit, but an error is corrected in image processing according to the super-resolution technique by detecting an actual shift value.

According to an embodiment of the present disclosure, the tilting unit 140 may change the optical path of the input light signal in software or hardware. In the above, it has been described as an example that the tilting unit 140 shifts the optical path of the input light signal by controlling the slope of the IR filter, but the present disclosure is not limited thereto.

In an embodiment of the present disclosure, the tilting unit 140 may repeatedly shift the optical path of the input light signal according to a predetermined rule. For example, the tilting unit 140 may, according to the predetermined rule, repeat processes of shifting the optical path of the input light signal in a first direction during a first period in the unit of a subpixel, which is larger than 0 pixel and smaller than 1 pixel, of the image sensor unit 130, shifting the optical path in a second direction perpendicular to the first direction during a second period in the unit of the subpixel, shifting the optical path in a third direction perpendicular to the second direction during a third period in the unit of the subpixel, and then shifting the optical path in a fourth direction perpendicular to the third direction during a fourth period in the unit of the subpixel. Herein, the subpixel may mean a unit larger than 0 pixel and smaller than 1 pixel. Herein, the shifted amount in each of the first, second, third and fourth directions during each of the first, second, third, and fourth periods may be expressed as a subpixel shift value or a shift value. For example, when one pixel includes 4 subpixels of 2*2 and is shifted in the unit of one subpixel, the shift value may be expressed as 1 subpixel, 0.5 pixel, or the like.

In an embodiment of the present disclosure, the image controller 150 may obtain one depth information by fusing a first image obtained from data extracted during the first period, a second image obtained from data extracted during the second period, a third image obtained from data extracted during the third period, and a fourth image obtained from data extracted during the fourth period, by a super-resolution technique. Here, the first, second, third, and fourth periods may be used interchangeably with the first, second, third, and fourth integration times, respectively, and the first, second, third, and fourth images may be used interchangeably with the aforementioned low-resolution subframe, low-resolution image, or the like.

According to an embodiment of the present disclosure, the ToF camera module 100 detects a shift value of the optical path of the input light, and controls the tilting unit 140 using the detected shift value, or may reflect the detected shift value to the generation of a depth image.

Figure 15:
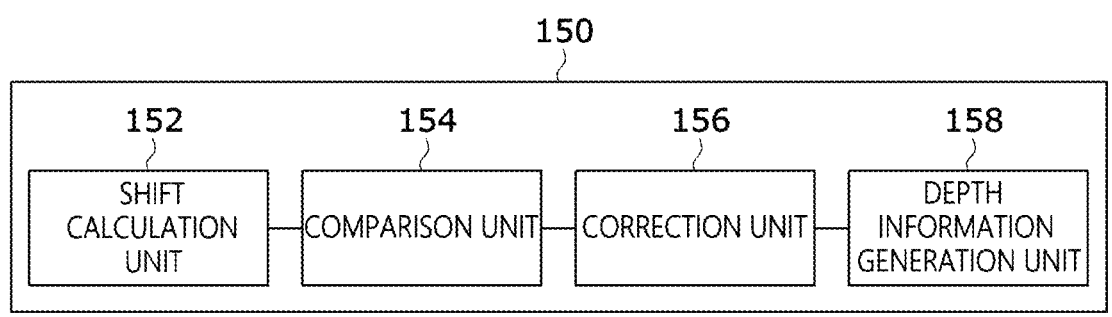
FIG. 15 is a block diagram of an image controller included in a ToF camera module according to an embodiment of the present disclosure.

FIG. 15 is a block diagram of an image controller included in a ToF camera module according to an embodiment of the present disclosure.

Referring to FIG. 15, the image controller 150 may include a shift calculation unit 152, a comparison unit 154, a correction unit 156, and a depth information generation unit 158. The shift calculation unit 152 may calculate an actual shift value of the optical path of the input light signal. The comparison unit 154 may compare the actual shift value of the optical path of the input light signal calculated by the shift calculation unit 152 to a preset shift value. In addition, as the comparison result of the comparison unit 154, when the difference between the actual shift value calculated by the shift calculation unit 152 and the preset shift value is greater than or equal to a threshold value, the correction unit 156 may correct it.

For example, the correction unit 156 may feedback the difference between the actual shift value and the preset shift value to the tilting unit 140, and the tilting unit 140 may reflect the information fed back from the correction unit 156 to shift the optical path of the input light signal. For example, when the actual shift value calculated by the shift calculation unit 152 is 0.6 pixels and the preset shift value for the optical path of the input light signal is 0.5 pixels, the correction unit 156 of the image controller 150 may inform the tilting unit 140 that the optical path of the input light signal has further been shifted by 0.1 pixels, and the tilting unit 140 may reflect this to shift the optical path of the input light signal.

Alternatively, the correction unit 156 may feedback the difference between the actual shift value and the preset shift value to the depth information generation unit 158, and the depth information generation unit 158 may use the information fed back from the correction unit 156 to generate depth information. For example, when the actual shift value calculated by the shift calculation unit 152 is 0.6 pixels, and the preset shift value for the optical path of the input light signal is 0.5 pixels, the depth image information generation unit may reflect the difference, i.e., 0.1 pixels between the actual shift value and the preset shift value to correct the depth image of the object.

Figure 16:
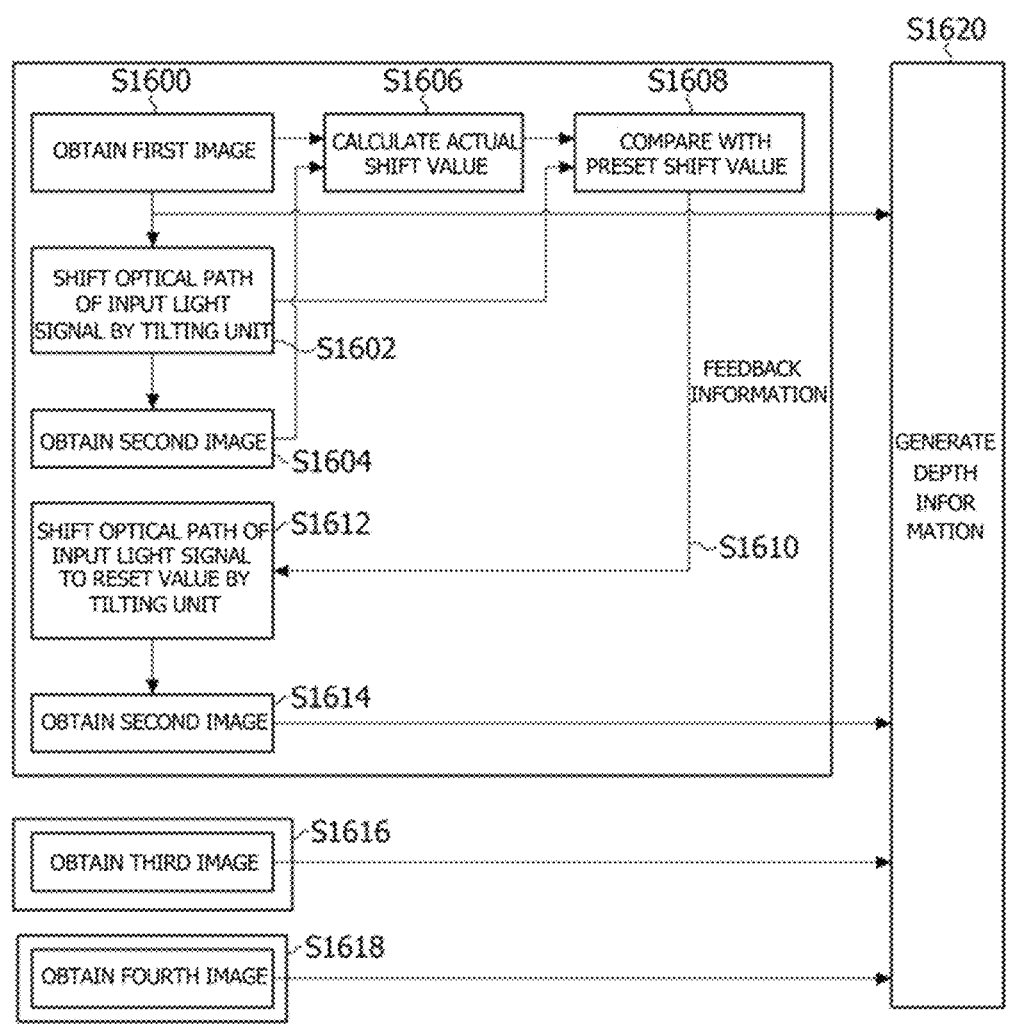
FIG. 16 is a flowchart illustrating a depth image generation method of a camera device according to an embodiment of the present disclosure.
Figure 17:
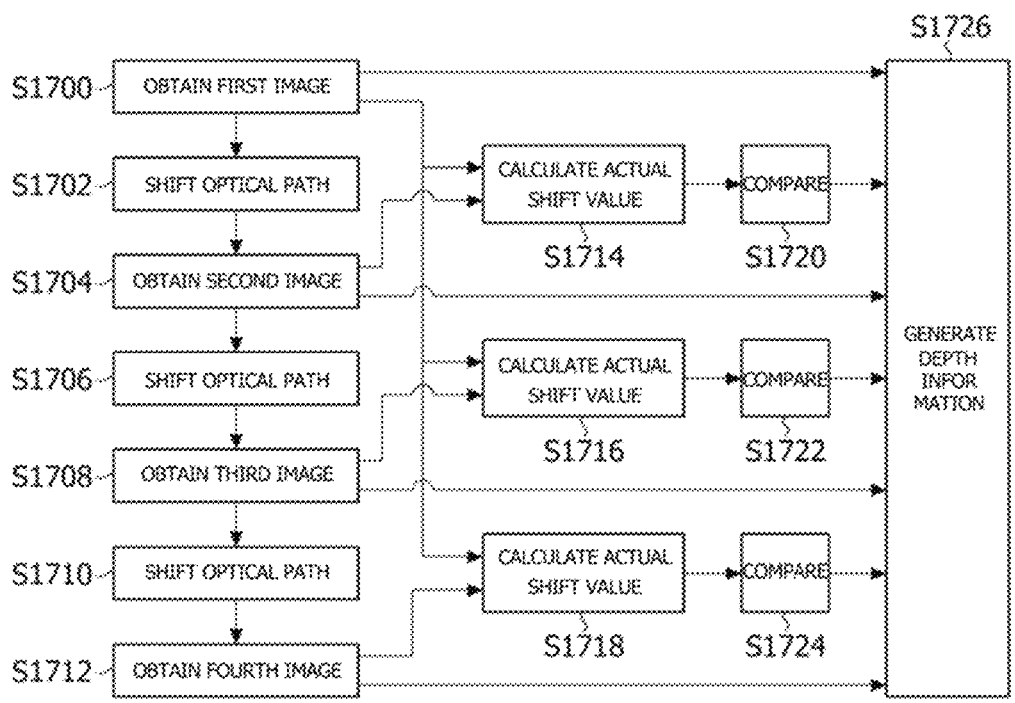
FIG. 17 is a flowchart illustrating a depth image generation method of a camera device according to another embodiment of the present disclosure.
Figure 18:
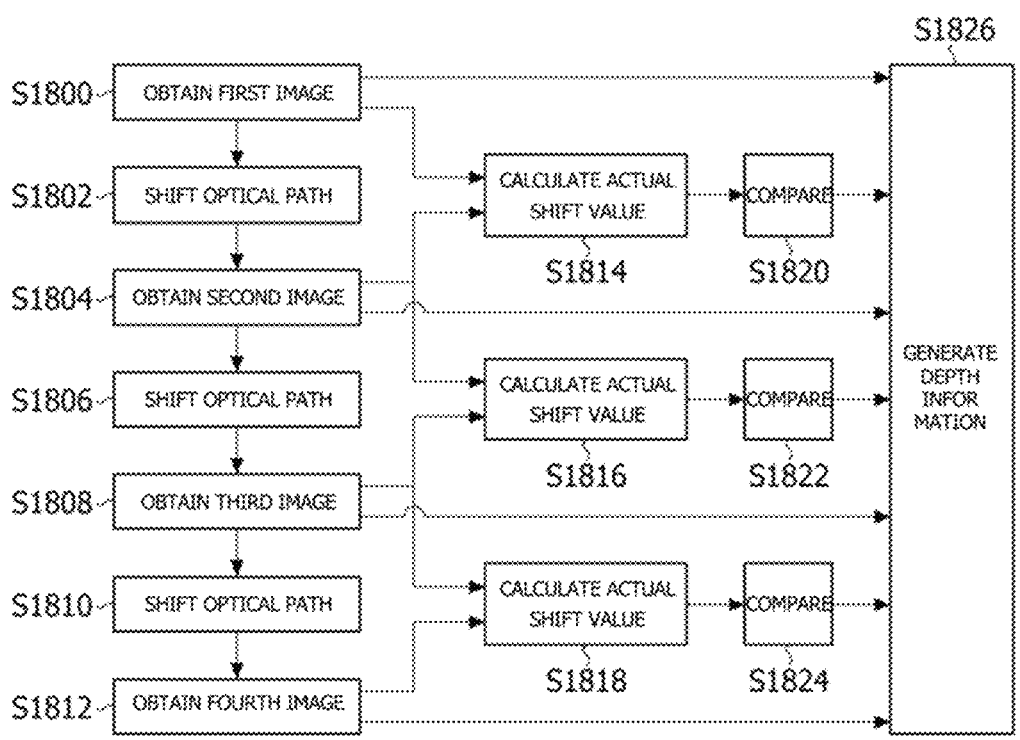
FIG. 18 is a flowchart illustrating a depth image generation method of a camera device according to still another embodiment of the present disclosure.

FIG. 16 is a flowchart illustrating a depth image generation method of a camera device according to an embodiment of the present disclosure. FIG. 17 is a flowchart illustrating a depth image generation method of a camera device according to another embodiment of the present disclosure. FIG. 18 is a flowchart illustrating a depth image generation method of a camera device according to still another embodiment of the present disclosure.

Referring to FIGS. 16 to 18, the image controller 150 of a camera device 100 according to an embodiment of the present disclosure generates one depth information by using a first image, a second image, a third image, and a fourth image. To this end, as described above, the first image, the second image, the third image, and the fourth image may be fused into one depth information or depth image using the super-resolution technique. The first image may be an image obtained from data extracted during a first period in which the optical path of the input light signal is shifted in a first direction based on a preset shift value. The second image may be an image obtained from data extracted during a second period in which the optical path of the input light signal is shifted in a second direction perpendicular to the first direction based on the preset shift value. The third image may be an image obtained from data extracted during a third period in which the optical path of the input light signal is shifted in a third direction perpendicular to the second direction based on the preset shift value. The fourth image may be an image obtained from data extracted during a fourth period in which the optical path of the input light signal is shifted in a fourth direction perpendicular to the third direction based on the preset shift value. Here, the first image, the second image, the third image, and the fourth image may refer to the aforementioned low-resolution image or low-resolution subframe, and may include depth information. One depth information or depth image generated by fusing the first image, the second image, the third image, and the fourth image using the super-resolution technique may refer to the aforementioned high-resolution subframe or high-resolution image.

Referring to FIG. 16, first, the image controller 150 obtains the first image (step S1600), the tilting unit 140 shifts the optical path of the input light signal based on the preset shift value (step S1602), and the image controller 150 obtains the second image (step S1604).

Next, the shift calculation unit 152 of the image controller 150 calculates an actual shift value of the optical path of the input light signal by using the first image and the second image (step S1606). To this end, the shift calculation unit 152 may calculate the actual shift value by using various techniques that compares the first image and the second image.

Next, the comparison unit 154 of the image controller 150 compares the actual shift value calculated in step S1606 with the preset shift value (step S1608), and as a result of the comparison, if the difference between the actual shift value and the preset shift value is greater than or equal to a threshold value, the correction unit 156 may reset the preset shift value and may inform the tilting unit 140 of the reset value (step S1610).

Then, the tilting unit 140 shifts the optical path of the input light signal based on the reset value (step S1612), and the image controller 150 acquires the second image again (step S1614).

In an embodiment of the present disclosure, a process of obtaining the third image (step S1616) and a process of obtaining the fourth image (step S1618) may also be the same as the process of obtaining the second image (steps S1600 to S1614).

In this case, in order to obtain the third image in step S1616, the second image and the third image may be compared, or the first image and the third image may be compared. Similarly, in order to obtain the fourth image in step S1618, the third image and the fourth image may be compared, the first image and the fourth image may be compared, or the second image and the fourth image may be compared.

The image controller 150 may generate one depth information or depth image by using the first image, the second image, the third image, and the fourth image obtained in this way (step S1620).

Referring to FIG. 17, processes of obtaining the first image (step S1700), shifting the optical path of the input light signal by the tilting unit 140 (step S1702), obtaining the second image (step S1704), shifting the optical path of the input light signal by the tilting unit 140 (step S1706), obtaining the third image (step S1708), shifting the optical path of the input light signal by the tilting unit 140 (step S1710), and then obtaining the fourth image (step S1712) are sequentially performed.

Meanwhile, the sequentially obtained first, second, third, and fourth images are inputted to the shift calculation unit 152, and the shift calculation unit 152 compares the first image and the second image to calculate the actual shift value for the second image (step S1714), compares the first image and the third image to calculate the actual shift value for the third image (step S1716), and compares the first image and the fourth image to calculate the actual shift value for the fourth image (step S1718). Then, the comparison unit 154 compares the actual shift values calculated in steps S1714, S1716, and S1718 with the preset shift value (steps S1720, S1722, and S1724), and when the depth information generation unit 158 generates the depth information using the super-resolution technique, the correction unit 156 may apply the comparison results of steps S1720, S1722, and S1724 thereto (step S1726). At this time, the correction unit 156 may correct a difference between the actual shift value and the preset shift value using an interpolation technique or the like.

Referring to FIG. 18, processes of obtaining the first image (step S1800), shifting the optical path of the input light signal by the tilting unit 140 (step S1802), obtaining the second image (step S1804), shifting the optical path of the input light signal by the tilting unit 140 (step S1806), obtaining the third image (step S1808), shifting the optical path of the input light signal by the tilting unit 140 (step S1810), and then obtaining the fourth image (step S1812) are sequentially performed.

Meanwhile, the sequentially obtained first, second, third, and fourth images are inputted to the shift calculation unit 152, and the shift calculation unit 152 compares the first image and the second image to calculate the actual shift value for the second image (step S1814), compares the second image and the third image to calculate the actual shift value for the third image (step S1816), and compares the third image and the fourth image to calculate the actual shift value for the fourth image (step S1818). Then, the comparison unit 154 compares the actual shift values calculated in steps S1814, S1816, and S1818 with the preset shift value (steps S1820, S1822, and S1824), and when the correction unit 156 generates a depth image, the correction unit 156 may apply the comparison results of steps S1820, S1822, and S1824 thereto. At this time, the correction unit 156 may correct a difference between the actual shift value and the preset shift value using an interpolation technique or the like.

As described above, according to an embodiment of the present disclosure, even if the tilting unit shifts the optical path of the input light signal to a value different from the preset shift value, the super-resolution technique may be performed with the corrected value, and accordingly accurate depth information may be acquired without changing hardware.

Although the above description has been given focusing on the embodiments, these are merely examples and do not limit the present disclosure, and it should be understood by those of ordinary skill in the field to which the present disclosure pertains that various modifications and applications not illustrated above are possible without departing from the essential characteristics of the present embodiment. For example, each component specifically shown in this embodiment may be modified and implemented. In addition, differences related to these modifications and applications should be construed as being included in the scope of the present disclosure defined in the appended claims.

[Explanation of numeral references]

100: ToF camera module
110: light output unit
120: lens unit
130: image sensor unit
140: tilting unit
150: image controller

The invention claimed is:

1. A camera device comprising:
a light output unit configured to output an output light signal to be irradiated to an object;
a lens unit including an infrared (IR) filter and at least one lens disposed on the IR filter, and configured to collect an input light signal reflected from the object;
an image sensor configured to generate an electric signal from the input light signal collected by the lens unit;
a tilting unit configured to shift an optical path of the input light signal according to a predetermined rule; and
an image controller configured to acquire depth information of the object by using a phase difference between the output light signal and the input light signal received by the image sensor,
wherein the image controller acquires the depth information of the object by using data extracted during a plurality of periods during which the optical path of the input light signal is repeatedly shifted according to the predetermined rule, and the image controller corrects a difference between an actual shift value and a preset shift value of the optical path of the input light signal.

2. The camera device according to claim 1, wherein according to the predetermined rule, the optical path of the input light signal is shifted in a first direction during a first period based on the preset shift value, is shifted in a second direction perpendicular to the first direction during a second period based on the preset shift value, is shifted in a third direction perpendicular to the second direction during a third period based on the preset shift value, and is shifted in a fourth direction perpendicular to the third direction during a fourth period based on the preset shift value, and wherein the image controller acquires the depth information of the object by fusing a first image obtained from data extracted during the first period, a second image obtained from data extracted during the second period, a third image obtained from data extracted during the third period, and a fourth image obtained from data extracted during the fourth period.

3. The camera device according to claim 2, wherein the image controller includes:

a shift calculation unit configured to calculate at least one of an actual shift value of the optical path of the input light signal in the first direction during the first period, an actual shift value of the optical path in the second direction during the second period, an actual shift value of the optical path in the third direction during the third period, and an actual shift value of the optical path in the fourth direction during the fourth period;

a comparison unit configured to compare the actual shift value calculated by the shift calculation unit with the preset shift value; and a correction unit configured to perform a correction when a difference between the actual shift value calculated by the shift calculation unit and the preset shift value is greater than or equal to a threshold value as a comparison result of the comparison unit.

4. The camera device according to claim 3, wherein according to the comparison result of the comparison unit, the correction unit resets the preset shift value and informs the tilting unit of a reset value, and wherein the tilting unit shifts the optical path of the input light signal based on the reset value.

5. The camera device according to claim 3, wherein the correction unit acquires the depth information of the object by applying the comparison result of the comparison unit to a fusion of the first image, the second image, the third image, and the fourth image.

6. The camera device according to claim 3, wherein the shift calculation unit calculates the actual shift value by comparing at least two of the first image, the second image, the third image, and the fourth image.

7. The camera device according to claim 6, wherein the shift calculation unit calculates a first actual shift value by comparing the first image and the second image, calculates a second actual shift value by comparing the first image and the third image, and calculates a third actual shift value by comparing the first image and the fourth image.

8. The camera device according to claim 6, wherein the shift calculation unit calculates a first actual shift value by comparing the first image and the second image, calculates a second actual shift value by comparing the second image and the third image, and calculates a third actual shift value by comparing the third image and the fourth image.

9. The camera device according to claim 1, wherein the preset shift value is larger than 0 pixel and smaller than 1 pixel.

10. A depth image generation method of a camera device, comprising:

outputting an output light signal to irradiate an object;

shifting an optical path of an input light signal reflected from the object according to a predetermined rule; and acquiring depth information of the object by using a phase difference between the output light signal and the input light signal, wherein said acquiring depth information of the object includes:

acquiring the depth information of the object by using data extracted during a plurality of periods during which the optical path of the input light signal is repeatedly shifted according to the predetermined rule; and correcting a difference between an actual shift value and a preset shift value of the optical path of the input light signal.

11. The camera device of claim 1, wherein the image controller is configured to extract the depth information of the object using a super resolution technique.

12. The camera device of claim 1, wherein the tilting unit controls a tilt of the IR filter.

13. The camera device of claim 12, wherein the tilting unit comprises at least one of a Micro Electro Mechanical Systems (MEMS), a Voice Coil Motor (VCM) and a piezo-electric element.

14. The camera device of claim 1, wherein the light output unit outputs the output light signal by a pulse wave or a continuous wave.

15. The camera device of claim 1, wherein the light output unit comprises a vertical cavity surface emitting laser (VCSEL).

16. The camera device of claim 3, wherein the correction unit is configured to correct the difference between the actual shift value and the preset shift value using an interpolation technique.

17. The depth image generation method according to claim 10 wherein according to the predetermined rule, the optical path of the input light signal is shifted in a first direction during a first period based on the preset shift value, is shifted in a second direction perpendicular to the first direction during a second period based on the preset shift value, is shifted in a third direction perpendicular to the second direction during a third period based on the preset shift value, and is shifted in a fourth direction perpendicular to the third direction during a fourth period based on the preset shift value.

18. The depth image generation method according to claim 17, wherein said acquiring depth information of the object includes:

acquiring the depth information of the object by fusing a first image obtained from data extracted during the first period, a second image obtained from data extracted during the second period, a third image obtained from data extracted during the third period, and a fourth image obtained from data extracted during the fourth period.

19. The depth image generation method according to claim 18, wherein said acquiring depth information of the object includes:

calculating at least one of an actual shift value of the optical path of the input light signal in the first direction during the first period, an actual shift value of the optical path in the second direction during the second period, an actual shift value of the optical path in the third direction during the third period, and an actual shift value of the optical path in the fourth direction during the fourth period;

comparing the actual shift value calculated by said calculating with the preset shift value; and performing a correction when the difference between the actual shift value calculated by said calculating and the preset shift value is greater than or equal to a threshold value as a comparison result of said comparing.

20. The depth image generation method according to claim 10 wherein said acquiring depth information of the object extracts the depth information of the object using a super resolution technique.

* * * * *